Patented Feb. 3, 1925.

1,525,211

UNITED STATES PATENT OFFICE.

JAMES L. STEVENS, OF HAYDEN, ARIZONA.

COMPOSITION OF MATTER AND METHOD OF MAKING SAME.

No Drawing.   Application filed August 23, 1924. Serial No. 733,854.

*To all whom it may concern:*

Be it known that I, JAMES L. STEVENS, a citizen of the United States, residing at Hayden, in the county of Gila, State of Arizona, have invented a certain new and useful Improvement in Composition of Matter and Methods of Making Same, of which the following is a specification.

This invention relates to a chemical compound or composition of matter which I have discovered and which is adapted for use as a flotation agent and for other purposes.

The main object of the present invention is to provide a compound or composition in which the alkyl-radical of a hydrocarbon of the paraffin series is combined or associated with carbon bisulphide in such manner as to be peculiarly effective for use as a flotation and sulfidizing agent, or as a vulcanizing agent, or for other purposes.

I have found that by using higher alcohols such as propyl, butyl, or amyl alcohols, or by using fusel oil containing such higher alcohols, and reacting upon the same with a suitable alkali and carbon bisulphide in the manner hereinafter set forth, a reaction product is produced having a marked advantage for the above stated purposes. I have also found that by suitably selecting the higher alcohol used, the amount of carbon bisulphide taken up by the reaction may be considerably increased beyond the limit which has heretofore been possible in compounds of this character. I have also found that by using the alkali in saturated aqueous solution the desired compound can be produced expeditiously and economically.

The composition or chemical compound constituting my invention is the resultant compound obtained from the mixing of certain higher alcohols (for example those contained in fusel oil), carbon bisulphide, and alkali, (such as potassium hydroxide) with or without water. In the preparation, the method and sequence of adding the chemicals may be varied. However I prefer to form an aqueous solution of the alkali (preferably a saturated solution) and add this to a mixture of fusel oil and carbon bisulphide.

In preparing the composition according to the present invention (using potassium hydroxide as the alkali), I prefer to use 44 parts by weight of the carbon bisulphide, 17 parts by weight of the fusel oil, and 39 parts by weight of the saturated solution of potassium hydroxide and water. However, I do not limit my claim to the use of any definite quantity of any of the chemicals herein named, as I have found that by varying the quantity of the chemicals used, for example by using 34.5 parts by weight of the carbon bisulphide, 20 parts by weight of the fusel oil, and 45.5 parts by weight of a saturated solution of potassium hydroxide and water, I have obtained a similar product possessing similar properties.

The proportions may however, be varied according to variations in constitution of the fusel oil or higher alcohols used, for example, from 15 to 35 parts of fusel oil, 25 to 50 parts of carbon bisulphide and sufficient alkali to react. It will thus be seen that the proportions may be varied considerably and especially the relative proportion of carbon bisulphide. This may be due to the formation of products consisting of different mixtures of compounds, said compounds containing one, two, three or more molecules of carbon bisulphide in combination, per molecule of alcohol. While for certain purposes a product containing as nearly as may be the maximum amount of carbon bisulphide, namely, three or more molecular equivalents is especially useful, I may also obtain a product containing less than this amount of carbon bisulphide.

Any suitable apparatus and method of procedure may be employed in preparing my composition of matter. For example, the mixture of carbon bisulphide and fusel oil in any of the above-described proportions, may first be introduced into a suitable vessel, provided with mechanical or other agitating means, and with a removable cover or other means for removal of the solid product, and preferably provided with a reflux condenser for preventing loss of carbon bisulphide or other volatile substances by volatilization due to the heat developed by the reaction. The desired amount of alkali solution may then be added and the mixture thoroughly agitated until reaction is complete, the length of time required varying with the proportions of the various ingredients used, for example from 10 to 30 minutes or longer. In general the reaction proceeds quite rapidly without application of heat, and in fact with the development of considerable heat of reaction. If, however, in any case, it is found desirable in order to hasten the reaction, the vessel may of course be heated, any suitable means being provided for this purpose. When the reaction is complete, the product is substantially in the form of a dry powder or granulated mass and may easily be removed from the reaction vessel. This product is solid at ordinary temperatures, and is readily soluble in water.

I do not limit my claim to the use of any one of the so-called alcoholic compounds contained in what is commonly known as fusel oil. For example, I have found that the fusel oil, used in the preparation of the product hereindescribed, contains various alcohols of the high distillation group, such as propyl, butyl, amyl, and other alcohols, in fact, I have found that the fusel oil, herein described, contains various alcohols distilling from 97° C. to 230° C. Any or all of the fractions distilling between the range of 97° C. to 230° C. may be used in the preparation of the product herein described.

It has been found, however, that the higher the alcohol, that is the greater the number of carbon atoms per molecule thereof, the greater is the molecular proportion of carbon bisulphide which will combine therewith. In some cases therefore in order to obtain a product with a maximum carbon bisulphide content, I may prefer to use only the higher of the alcohol constituents of fusel oil, for example butyl, amyl, or hexyl alcohol or any alcoholic product containing one or more of the same, and having a boiling-point, for example, between 117° C. and 157° C., and in particular, very good results may be obtained with the commercial grade of alcohol known as amylic alcohol.

I do not limit my claim to the use of potassium hydroxide as an alkali in preparing the composition of the present invention, as for example, I have found that other alkalies, such as sodium hydroxide, may be substituted for potassium hydroxide.

I am not certain what chemical reaction takes place in the formation of the above-described composition of matter, nor what is the exact formula of the compound or compounds obtained. However the molecular proportions of the various components used, and a possible formula of the reaction product may be indicated by means of the equation, assuming caustic potash as the alkali used,—

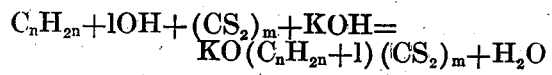

in which $n$ may be any number from 3 to 6 inclusive and $m$ may be 1, 2, or 3 or possibly a higher number, depending on the proportion of carbon bisulphide to the higher alcohol used. It will be observed that water is also formed as a product of the reaction, but this may be assumed to be taken up as water of crystallization, thus forming a substantially dry product. I do not, however, wish to limit myself to the above equation or formula, as other reactions may take place and other products may be formed. I have also found that in general the reaction proceeds more readily in the presence of additional water, for example, that used in preparing the solution of caustic potash or other alkali, and while I am not able as yet to definitely state what becomes of this water, it may be assumed that it also enters into the reaction either as water of crystallization or otherwise.

What I claim is:

1. A composition of matter consisting of the reaction product of fusel oil, carbon bisulphide, and alkali.

2. A composition of matter consisting of the reaction product of fusel oil, carbon bisulphide, and alkali, in the presence of water.

3. A composition of matter consisting of the reaction product of 15 to 35 parts of fusel oil, 25 to 50 parts of carbon bisulphide and sufficient alkali to react with said other components.

4. A composition of matter consisting of the reaction product of 15 to 35 parts of fusel oil, 25 to 50 parts of carbon bisulphide, sufficient alkali to react with said other components, and water.

5. A composition of matter consisting of the reaction product of a higher alcohol having a boiling point between 97° and 230° C., carbon bisulphide, and alkali.

6. A composition of matter consisting of the reaction product of a higher alcohol having a boiling point between 97° and 230° C., carbon bisulphide, alkali, and water.

7. A composition of matter consisting of the reaction product of a higher alcohol having a boiling-point between 117° and 157° C., carbon bisulphide, and alkali.

8. A composition of matter consisting of the reaction product of a higher alcohol having a boiling point between 117° and 157° C., carbon bisulphide, alkali, and water.

9. A composition of matter consisting of the reaction product of amylic alcohol, carbon bisulphide, and alkali.

10. A composition of matter consisting of the reaction product of amylic alcohol, carbon bisulphide, alkali, and water.

11. A composition of matter consisting of the reaction product of fusel oil, carbon bisulphide, and a saturated aqueous solution of alkali.

12. A composition of matter consisting of the reaction product of a higher alcohol having a boiling-point between 97° and 230° C., carbon bisulphide, and a saturated aqueous solution of an alkali.

13. A composition of matter consisting of the reaction product of a higher alcohol having a boiling-point between 117° and 157° C., carbon bisulphide, and a saturated aqueous solution of alkali.

14. A composition of matter consisting of the reaction product of 15 to 35 parts of fusel oil, 25 to 50 parts of carbon bisulphide, and sufficient saturated aqueous solution of alkali to react.

15. A composition of matter consisting of the reaction product of a higher alcohol, carbon bisulphide, and alkali, the proportions of the alcohol and carbon bisulphide being such as to provide two or more molecular equivalents of carbon bisulphide for each molecular equivalent of the alcohol.

16. A composition of matter consisting of the reaction product of a higher alcohol, carbon bisulphide, alkali, and water, the proportions of the alcohol and carbon bisulphide being such as to provide two or more molecular equivalents of carbon bisulphide for each molecular equivalent of the alcohol.

17. A composition of matter consisting of the reaction product of a higher alcohol, carbon bisulphide, and saturated aqueous solution of alkali, the proportions of the alcohol and carbon bisulphide being such as to provide two or more molecular equivalents of carbon bisulphide for each molecular equivalent of the alcohol.

18. The method which consists in mixing fusel oil, carbon bisulphide, and alkali, and agitating the mixture.

19. The method which consists in mixing fusel oil, carbon bisulphide, alkali, and water, and agitating the mixture.

20. The method which consists in mixing fusel oil, carbon bisulphide, and a saturated aqueous solution of alkali, and agitating the mixture.

21. The method which consists in mixing 15 to 35 parts of fusel oil, 25 to 50 parts of carbon bisulphide, and sufficient alkali to react, and agitating the mixture until reaction is complete.

22. The method which consists in mixing 15 to 35 parts of fusel oil, 25 to 50 parts of carbon bisulphide, sufficient alkali to react, and water, and agitating the mixture until reaction is complete.

23. The method which consists in mixing 15 to 35 parts of fusel oil, 25 to 50 parts of carbon bisulphide, and sufficient saturated aqueous solution of alkali to react, and agitating the mixture until reaction is complete.

24. The method which consists in mixing a higher alcohol having a boiling point between 97° C. and 230° C., carbon bisulphide, and alkali, and agitating the mixture until reaction is complete.

25. The method which consists in mixing a higher alcohol having a boiling point between 97° and 230° C., carbon bisulphide, alkali, and water, and agitating the mixture until reaction is complete.

26. The method which consists in mixing a higher alcohol having a boiling point between 97° and 230° C., carbon bisulphide, and a saturated aqueous solution of alkali, and agitating the mixture until reaction is complete.

27. The method which consists in mixing a higher alcohol having a boiling-point between 117° and 157° C., carbon bisulphide, and alkali, and agitating the mixture until reaction is complete.

28. The method which consists in mixing a higher alcohol having a boiling point between 117° and 157° C., carbon bisulphide, alkali, and water, and agitating the mixture until reaction is complete.

29. The method which consists in mixing a higher alcohol having a boiling-point between 117° and 157° C., carbon bisulphide, and a saturated aqueous solution of alkali, and agitating the mixture until reaction is complete.

30. The method which consists in mixing amylic alcohol, carbon bisulphide, and alkali, and agitating the mixture until reaction is complete.

31. The method which consists in mixing amylic alcohol, carbon bisulphide, and a saturated aqueous solution of alkali, and agitating the mixture until reaction is complete.

32. The method which consists in mixing amylic alcohol, carbon bisulphide, and a saturated aqueous solution of alkali, and agitating the mixture until reaction is complete.

33. The method which consists in mixing a higher alcohol and carbon bisulphide in the proportions of two or more molecular equivalents of the latter for each molecular equivalent of the former, with sufficient alkali to react, and agitating the mixture until reaction is complete.

34. The method which consists in mixing a higher alcohol and carbon bisulphide in the proportions of two or more molecular equivalents of the latter for each molecular equivalent of the former, with sufficient alkali to react, in the presence of water, and agitating the mixture until reaction is complete.

35. The method which consists in mixing a higher alcohol and carbon bisulphide in the proportions of two or more molecular equivalents of the latter for each molecular equivalent of the former, with sufficient saturated solution of alkali to react, and agitating the mixture until reaction is complete.

In testimony whereof I have hereunto subscribed my name this 12 day of Aug., 1924.

JAMES L. STEVENS.